United States Patent
Girouard et al.

(10) Patent No.: US 7,222,163 B1
(45) Date of Patent: May 22, 2007

(54) SYSTEM AND METHOD FOR HOSTING OF VIDEO CONTENT OVER A NETWORK

(75) Inventors: David Girouard, San Francisco, CA (US); Bradley Horowitz, San Mateo, CA (US); Richard Humphrey, San Mateo, CA (US); Charles Fuller, Foster City, CA (US)

(73) Assignee: Virage, Inc., San Mateo, CA (US)

( * ) Notice: Subject to any disclaimer, the term of this patent is extended or adjusted under 35 U.S.C. 154(b) by 972 days.

(21) Appl. No.: 09/827,772

(22) Filed: Apr. 6, 2001

Related U.S. Application Data (60) Provisional application No. 60/195,667, filed on Apr. 7, 2000.

(51) Int. Cl.
*G06F 15/16* (2006.01)

(52) U.S. Cl. .................. 709/219; 709/203; 709/204; 709/217; 709/231; 725/61; 725/86

(58) Field of Classification Search ........ 709/200–204, 709/217–219, 226, 231; 725/61, 86–87, 725/96
See application file for complete search history.

(56) References Cited

U.S. PATENT DOCUMENTS

| | | | |
|---|---|---|---|
| 5,485,553 A | 1/1996 | Kovalick et al. | |
| 5,557,320 A | 9/1996 | Krebs | |
| 5,613,032 A | 3/1997 | Cruz et al. | |
| 5,664,227 A | 9/1997 | Mauldin et al. | |
| 5,677,994 A | 10/1997 | Miyamori et al. | |
| 5,692,104 A | 11/1997 | Chow et al. | |
| 5,701,153 A | 12/1997 | Reichek et al. | |
| 5,774,170 A | 6/1998 | Hite et al. | |
| 5,774,664 A | 6/1998 | Hidary et al. | |
| 5,778,181 A | 7/1998 | Hidary et al. | |
| 5,822,024 A | 10/1998 | Setogawa et al. | |
| 5,828,809 A | 10/1998 | Chang et al. | |
| 5,835,667 A | 11/1998 | Wactlar et al. | |
| 5,861,881 A | 1/1999 | Freeman et al. | |
| 5,864,823 A | 1/1999 | Levitan | |
| 5,884,056 A | 3/1999 | Steele | |
| 5,903,892 A | 5/1999 | Hoffert et al. | |
| 5,917,958 A | 6/1999 | Nunally et al. | |
| 5,963,702 A | 10/1999 | Yamashita | |
| 5,983,176 A | 11/1999 | Hoffert et al. | |
| 5,987,454 A | 11/1999 | Hobbs | |

(Continued)

OTHER PUBLICATIONS

PR Newswire Association, Inc., "Duquesne University to Offer First Searchable Video Classes Over the Web; Partners With ISLIP Media to Build Advanced Internet Video Classes," Dec. 15, 1998.

(Continued)

*Primary Examiner*—Bharat Barot
(74) *Attorney, Agent, or Firm*—Knobbe Martens Olson & Bear LLP (57) ABSTRACT

A system and method that provide a hosted application and associated services for encoding, indexing, publishing and searching video media to content owners on a public network. The system and method allow the user interface to be customized and injected into the content-owner's website using dynamic HTML and template-based presentation mechanisms, thereby greatly enhancing the website's branding, advertising, and community building capabilities.

32 Claims, 7 Drawing Sheets

U.S. PATENT DOCUMENTS

| | | | |
|---|---|---|---|
| 5,987,509 A | | 11/1999 | Portuesi |
| 6,006,241 A | | 12/1999 | Purnaveja et al. |
| 6,006,257 A | | 12/1999 | Slezak |
| 6,006,265 A | | 12/1999 | Rangan et al. |
| 6,009,410 A | | 12/1999 | LeMole et al. |
| 6,014,693 A | * | 1/2000 | Ito et al. ............... 709/219 |
| 6,018,768 A | | 1/2000 | Ullman et al. |
| 6,034,942 A | | 3/2000 | Yoshio et al. |
| 6,112,226 A | * | 8/2000 | Weaver et al. ............... 709/203 |
| 6,119,154 A | * | 9/2000 | Weaver et al. ............... 709/219 |
| 6,205,260 B1 | | 3/2001 | Crinon et al. |
| 6,259,828 B1 | | 7/2001 | Crinon et al. |
| 6,285,788 B1 | | 9/2001 | Sezan et al. |
| 6,356,658 B1 | | 3/2002 | Sezan et al. |
| 6,360,234 B2 | | 3/2002 | Jain et al. |
| 6,370,543 B2 | | 4/2002 | Hoffert et al. |
| 6,389,473 B1 | | 5/2002 | Carmel et al. |
| 6,463,444 B1 | | 10/2002 | Jain et al. |
| 6,473,804 B1 | * | 10/2002 | Kaiser et al. ............... 709/245 |
| 6,567,980 B1 | * | 5/2003 | Jain et al. ............... 725/61 |
| 6,640,145 B2 | * | 10/2003 | Hoffberg et al. ............... 709/200 |
| 6,760,749 B1 | * | 7/2004 | Dunlap et al. ............... 709/204 |
| 6,774,926 B1 | | 8/2004 | Ellis et al. |
| 6,795,863 B1 | * | 9/2004 | Doty, Jr. ............... 709/231 |
| 6,833,865 B1 | | 12/2004 | Fuller et al. |
| 6,877,134 B1 | | 4/2005 | Fuller et al. |
| 2002/0056123 A1 | | 5/2002 | Liwerant et al. |

OTHER PUBLICATIONS

Virage, Inc. Brochure, "Video Search Tools," Copyright 1999.

Virage, Inc. Brochure, "MyLogger™," Copyright 1999.

Virage, Inc. Brochure, "Virage Interactive™," Copyright 1999.

Page from Virage Web Site, "Press Releases," virage.com/news/dec_1999_mylogger-launch.html, Dec. 7, 1999.

Page from Virage Web Site, "Virage Interactive," virage.com/products/vi.html, printed Jan. 6, 2000.

Page from Virage Web Site, "MyLogger," virage.com/products/mylogger.html, printed Jan. 6, 2000.

Page from Virage Web Site, "Video Search Tools," virage.com/products/vst.html, printed Jan. 6, 2000.

Page from Innovatv.com Web Site, "Seeing is believing," innovatv.com/news_011000_em.htm, Jan. 10, 2000.

Page from Innovatv.com Web Site, "Tools & Technology," innovatv.com/tools.htm, printed Mar. 20, 2000.

Page from Innovatv.com Web Site, "iMag," innovatv.com/iMag.htm, printed Mar. 20, 2000.

Page from Innovatv.com Web Site, "myiMag.com" myimag.com/afterlogin4.asp, printed Mar. 20, 2000.

Page from MediaSite Web Site, "First Searchable Video Website Solution Adds New Content Providers," mediasite.net/info/prcontent.htm, Jun. 24, 1999.

Page from MediaSite Web Site, "MediaSite WebFinder 4.0," mediasite.net/info/ps_mkfin.htm, printed Jul. 28, 2000.

Page from MediaSite Web Site, "MediaSite Publisher Modules," mediasite.net/info/ps_mkbul.htm, printed Jul. 28, 2000.

Page from MediaSite Web Site, "Branded MediaSites," mediasite.net/info/ps_branded.htm, printed Jul. 28, 2000.

Page from Akamai Web Site, "How EdgeScape Works," akamai.com/html/en/sv/edgescape_works.html, printed Mar. 27, 2001.

Hampapur et al., "Virage Video Engine," Virage, Inc., Mar. 1997, San Mateo, CA.

Virage, Inc., "Virage Media Management System," 1997, San Mateo, CA (brochure).

Virage, Inc., "The Virage Media Manager & Browser 1.1," 1998, San Mateo, CA (brochure).

Virage, Inc., "The Virage Video Cataloger 1.1," 1998, San Mateo, CA (brochure).

Virage, Inc., "Virage Video Cataloger & Video Browser," 1997, San Mateo, CA (brochure).

Virage, Inc., "The Virage Video Cataloger 1.3," 1998, San Mateo, CA (brochure).

Virage, Inc., "Virage Releases VideoLogger 2.0 at Streaming Media '98 Conference," 1998, San Mateo, CA (new release).

* cited by examiner

SYSTEM AND METHOD FOR HOSTING OF VIDEO CONTENT OVER A NETWORK

RELATED APPLICATIONS

This application claims priority to U.S. Provisional Application No. 60/195,667, filed Apr. 7, 2000 and titled "INTERACTIVE VIDEO APPLICATION HOSTING," which is hereby incorporated by reference. This application is related to U.S. Application No. 09/828,618, filed Apr. 6, 2001 and titled "VIDEO-ENABLED COMMUNITY BUILDING," U.S. Application No. 09/828,507, filed Apr. 6, 2001 and titled "VIDEO-ENABLED E-COMMERCE," and U.S. Application No. 09/828,506, filed Apr. 6, 2001 and titled "NETWORK VIDEO GUIDE AND SPIDERING," which are all hereby incorporated by reference.

BACKGROUND OF THE INVENTION

1. Field of the Invention

The present invention generally relates to the field of accessing and processing digital video on a network such as the Internet. More particularly, the invention relates to providing media content owners the capability to deliver media content to end users as an interactive experience.

2. Description of the Related Technology

A number of techniques have evolved in recent years as the Internet has grown in size and sophistication, including:
  The use of web servers and HTML delivery to web browsers.
  The use of the application-server model for connecting database information with web pages and interactive interfaces for end users.
  The use of dynamically generated HTML that pulls information from a database to dynamically format HTML for delivery to the end user.
  The use of a template language to merge database output with pre-formatted HTML presentations.
  The use of 'cookies' to track individual user preferences as they interact with the web pages and applications.

These and other related web technologies and techniques are in commonplace use and readily accessible on the Internet.

In addition to the technologies described above, video indexing technology has also emerged, herein referred to as 'video logging'. Video logging is a process that incorporates both automated indexing and manual annotation facilities to create a rich, fine-grained (in a temporal sense) index into a body of video content. The index typically consists of a combination of visual and textual indices that permit time-based searching of video content. The index may incorporate spoken text, speaker identifications, facial identifications, on-screen text, and additional annotations, keywords, and descriptions that may be applied by a human user executing the video logging application. The Virage VideoLogger is one example of this type of video logging technology that is commercially available.

The delivery of streaming media on the Internet requires the encoding of video content into one or more streaming video formats and efficient delivery of that content to the end users. Common streaming formats presently in use include RealVideo, Microsoft Windows Media, QuickTime, and MPEG. The video logging technology may coordinate the encoding of one or more of these formats while the video is being indexed to ensure that the video index is time-synchronized with the encoded content. The final delivery of media content to an end user is typically accomplished with a wide variety of video serving mechanisms and infrastructure. These mechanisms may include basic video servers (such as those from Real, Microsoft, and Apple), caching appliances (such as those from CacheFlow, Network Appliance, Inktomi, and Cicso), and content delivery networks (herein "CDN's", such as those from Akamai, Digital Island, iBeam, and Adero). These types of video serving mechanisms deliver media content to the end user.

Media content owners often wish to offer their content on the Internet for a variety of purposes, including commerce, community building, and to generate revenue through advertising and syndication mechanisms. The delivery of interactive, searchable, and personalized video content (for example video, Flash™, Synchronized Multimedia Integration Language or SMIL, and similar formats, herein collectively referred to as 'video') on the Internet is a difficult task to accomplish for a majority of content owners. It would require significant time and monetary investments in technical infrastructure as well as the expertise of Information Technology ("IT") professionals within the content owner's organization to achieve the desired business goals.

Among the important business criteria for success in this area is that the content owner retains total control over their content. It is beneficial for the content owners to have control over the presentation, delivery, access controls, and editorial-indexing aspects of their content at all times. Therefore, what is needed in the technology is a system whereby a service provider can offer a hosted application and associated services for encoding and indexing video media that achieves the content owner's business goals without requiring the existence of technical infrastructure and expertise within the content owner's own organization.

SUMMARY OF CERTAIN INVENTIVE ASPECTS

By using dynamically generated HTML and branded, embedded video player windows, the hosted interactive video application service can deliver the content owner's content to the end users in a seamless fashion, such that the end user does not perceive that they have ever 'left' the content owner's website. These features greatly enhance the content owner's purposes related to website commerce, community building, and generation of revenue through advertising and syndication mechanisms. All of these beneficial criteria are realized by the video application hosting techniques disclosed in the present invention.

In one embodiment, the invention provides a system for hosting of video content over a network, comprising a content owner facility, comprising a content owner network server, and a service facility comprising a video encoding module configured to receive the video content, a video logging module configured to receive the video content and generate an index of the video content, a video application server module configured to receive the index of the video content, and a service facility network server configured to receive the index of the video content and produce electronic templates for use by the content owner network server. The system further comprises a content distribution network configured to receive encoded video from the video encoding module and provide encoded video to a user.

In another embodiment, the invention provides a system for delivering media content services over a network, comprising media content to which a content owner has rights, a content owner facility comprising a content owner network server, and a service facility comprising a video processing module configured to extract metadata from the media content and encode the media content and a hosted video application module configured to provide video elements for display on the content owner facility network site. The system further comprises a content distribution network providing media content to a user.

In another embodiment, the invention provides a method for hosting of video content over a network, comprising providing video content for video processing, encoding the video content, indexing the video content to generate a video index, providing video elements for incorporation in a content owner network site, and delivering the encoded video to a user via a network.

BRIEF DESCRIPTION OF THE DRAWINGS

The above and other aspects, features and advantages of the invention will be better understood by referring to the following detailed description, which should be read in conjunction with the accompanying drawings. These drawings and the associated description are provided to illustrate various embodiments of the invention, and not to limit the scope of the invention.

DETAILED DESCRIPTION OF CERTAIN EMBODIMENTS

The following detailed description of certain embodiments presents various descriptions of specific embodiments of the present invention. However, the present invention can be embodied in a multitude of different ways as defined and covered by the claims. In this description, reference is made to the drawings wherein like parts are designated with like numerals throughout.

Definitions

The following provides a number of useful possible definitions of terms used in describing certain embodiments of the disclosed invention.

A network may refer to a network or combination of networks spanning any geographical area, such as a local area network, wide area network, regional network, national network, and/or global network. The Internet is an example of a current global computer network. Those terms may refer to hardwire networks, wireless networks, or a combination of hardwire and wireless networks. Hardwire networks may include, for example, fiber optic lines, cable lines, ISDN lines, copper lines, etc. Wireless networks may include, for example, cellular systems, personal communications service (PCS) systems, satellite communication systems, packet radio systems, and mobile broadband systems. A cellular system may use, for example, code division multiple access (CDMA), time division multiple access (TDMA), personal digital phone (PDC), Global System Mobile (GSM), or frequency division multiple access (FDMA), among others.

A website may refer to one or more interrelated web page files and other files and programs on one or more web servers. The files and programs are accessible over a computer network, such as the Internet, by sending a hypertext transfer protocol (HTTP) request specifying a uniform resource locator (URL) that identifies the location of one of said web page files, wherein the files and programs are owned, managed or authorized by a single business entity. Such files and programs can include, for example, hypertext markup language (HTML) files, common gateway interface (CGI) files, and Java applications. The web page files preferably include a home page file that corresponds to a home page of the website. The home page can serve as a gateway or access point to the remaining files and programs contained within the website. In one embodiment, all of the files and programs are located under, and accessible within, the same network domain as the home page file. Alternatively, the files and programs can be located and accessible through several different network domains.

A web page or electronic page may comprise that which is presented by a standard web browser in response to an HTTP request specifying the URL by which the web page file is identified. A web page can include, for example, text, images, sound, video, and animation.

Content, media content and streaming media content may refer to the delivery of electronic materials such as music, videos, software, books, multimedia presentations, images, and other electronic data, for example over a network to one or more users. Content data will typically be in the form of computer files for video, audio, program, data and other multimedia type content as well as actual physical copies of valuable content, for example CD-ROM, DVD, VCR, audio, TV or radio broadcast signals, streaming audio and video over networks, or other forms of conveying such information. The terms content, media content and streaming media content may be used interchangeably herein.

A computer or computing device may be any processor controlled device that permits access to the Internet, including terminal devices, such as personal computers, workstations, servers, clients, mini-computers, main-frame computers, laptop computers, a network of individual computers, mobile computers, palm-top computers, hand-held computers, set top boxes for a television, other types of web-enabled televisions, interactive kiosks, personal digital assistants, interactive or web-enabled wireless communications devices, mobile web browsers, or a combination thereof. The computers may further possess one or more input devices such as a keyboard, mouse, touch pad, joystick, pen-input-pad, and the like. The computers may also possess an output device, such as a visual display and an audio output. One or more of these computing devices may form a computing environment.

These computers may be uni-processor or multi-processor machines. Additionally, these computers may include an addressable storage medium or computer accessible medium, such as random access memory (RAM), an electronically erasable programmable read-only memory (EE- PROM), programmable read-only memory (PROM), erasable programmable read-only memory (EPROM), hard disks, floppy disks, laser disk players, digital video devices, compact disks, video tapes, audio tapes, magnetic recording tracks, electronic networks, and other techniques to transmit or store electronic content such as, by way of example, programs and data. In one embodiment, the computers are equipped with a network communication device such as a network interface card, a modem, or other network connection device suitable for connecting to the communication network. Furthermore, the computers execute an appropriate operating system such as Linux, Unix, any of the versions of Microsoft Windows, Apple MacOS, IBM OS/2 or other operating system. The appropriate operating system may include a communications protocol implementation that handles all incoming and outgoing message traffic passed over the Internet. In other embodiments, while the operating system may differ depending on the type of computer, the operating system will continue to provide the appropriate communications protocols to establish communication links with the Internet.

The computers may contain program logic, or other substrate configuration representing data and instructions, which cause the computer to operate in a specific and predefined manner, as described herein. In one embodiment, the program logic may be implemented as one or more object frameworks or modules. These modules may be configured to reside on the addressable storage medium and configured to execute on one or more processors. The modules include, but are not limited to, software or hardware components that perform certain tasks. Thus, a module may include, by way of example, components, such as, software components, object-oriented software components, class components and task components, processes, functions, attributes, procedures, subroutines, segments of program code, drivers, firmware, microcode, circuitry, data, databases, data structures, tables, arrays, and variables.

The various components of the system may communicate with each other and other components comprising the respective computers through mechanisms such as, by way of example, interprocess communication, remote procedure call, distributed object interfaces, and other various program interfaces. Furthermore, the functionality provided for in the components, modules, and databases may be combined into fewer components, modules, or databases or further separated into additional components, modules, or databases. Additionally, the components, modules, and databases may be implemented to execute on one or more computers. In another embodiment, some of the components, modules, and databases may be implemented to execute on one or more computers external to the website. In this instance, the website includes program logic, which enables the website to communicate with the externally implemented components, modules, and databases to perform the functions as disclosed herein.

Certain Innovative Aspects

One embodiment of the present system and method includes techniques whereby indexing, encoding, publishing, and searching of video is provided as a service to content owners on the Internet. A search application allows the user interface to be customized and injected into the content-owner's website using dynamic HTML and template-based presentation mechanisms. In this way, the video content and search/retrieval interface appears to be a seamless part of the content owner's website. The content owner may thereby integrate easily publishable and searchable video with opportunities to tie advertising and e-commerce transactions to the video content, thereby enhancing the value of their website. In addition, by allowing the user access to the video services described herein without having to leave the content owner's website, the time on the website is increased, also enhancing the website's value.

The content owner may provide content to the service facility for processing via many media sources, including, but not limited to, tape, cable, satellite, or digital files. The content may be encoded or transcoded into various video formats, for example, Real, Windows Media, or QuickTime, and indexed. Indexing may be performed using a video logging application, such as the Virage VideoLogger, that analyzes the video signal to extract metadata. Metadata is not the video data itself, but instead is data that is derived by processing performed on the video, audio, or closed caption inputs using advanced media analysis algorithms. Human operators may add additional editorial information through a process commonly referred to as 'clip marking'. The result is an index of the visual, audio, and textual elements of the video content, synchronized with the corresponding streaming video.

In one embodiment, the video index is loaded into a video index database by a video application server, where it becomes part of a database of video content. The encoded video is similarly loaded onto a video server, where the video application injects interactive video elements into the content owner's website through the use of templates and web page component URLs. Interactive video elements typically include the simple clip publishing elements, search forms, results pages, video player windows, or other potential features, for example a 'favorites' window or personalization capabilities. The final web page that an end user sees may therefore be a composite of graphical and text elements being served by various servers, and may include the content owner's web server. This interaction of various servers is not noticeable to an end user. The video search application hosting is therefore nearly indiscernible to the end user, appearing to be part of the content owner's website.

In one embodiment, the interactive video becomes part of the content owner's website, not a separate web destination. This enhances website value in the form of branding, community building, and e-commerce within the content owner's site. The content owner does not incur the significant costs of developing information technology infrastructure or building in-house video processing expertise. Instead, they are able to purchase this capability as a service at a lower cost and in a shorter amount of time. Additionally, the content owner is able to retain complete control over the presentation, delivery, and access to their content, paramount for the ultimate business success of such an endeavor. Content owners are typically highly reluctant to delegate any of this type of control to a third party. One innovative aspect of the present system and method is therefore the ability to provide remote, web-based interfaces that allow content owners to access and modify the template mechanism for the presentation of their content, and the ability to define guidelines and remotely edit the video index metadata according to their own editorial policies.

In certain embodiments, the interactive video application hosting aspect of the present system and method is delivered via a persistent application server (herein referred to as the Video Application Server, or "VAS"). The VAS may share many common features with standard web-based application servers, namely, interfacing with an off-the-shelf web server, for example Apache, Netscape, or Microsoft Internet Information Server, and providing application logic that delivers the desired experience and end-user interface through a standard HTML web browser.

One innovative aspect of the VAS as it relates to the present system and method is the ability to interface with video logging applications to receive and process video metadata and manage a video index on behalf of the content owner. A single VAS server can organize, manage, and administer multiple video indices for multiple content owners using a multi-level 'account' and 'view' structure, which separates the actual content from the presentation of that content. This innovation of separation and account management enables the hosting of the video application for multiple content owners from a single network operating facility, and enhances the overall scalability of the hosted-application framework and delivery model. Separation of content and presentation is also a desirable aspect for syndication business models that allow the same content to be delivered through a wide variety of user interfaces, each one specific to a given website and containing unique layout, advertising, commerce, and personalization capabilities.

Another innovative aspect of this embodiment of the VAS is its ability to publish, search, and provide an interactive video experience for the end user through the use of a specialized template language that is designed specifically for the needs of web-based video. While template languages have been widely used for dynamic HTML presentation, the VAS template language contains novel capabilities that specifically allow video content to be published, searched, and rendered in a manner that is customized for a particular site or use of the content. This includes, but is not limited to, advertising opportunities, integration with traditional web content presentations, e-commerce features tied directly to the video content, and personalization of video content. As an example, an end user who is a Chicago Bulls fan may be presented with Bulls video highlights, along with advertising for an upcoming game and an opportunity to purchase a team poster. These capabilities emerge from the combined mechanisms of a rich video index, content-based targeting of advertising and commerce, and traditional web-based delivery and streaming techniques.

DESCRIPTION OF THE FIGURES

Figure 1:
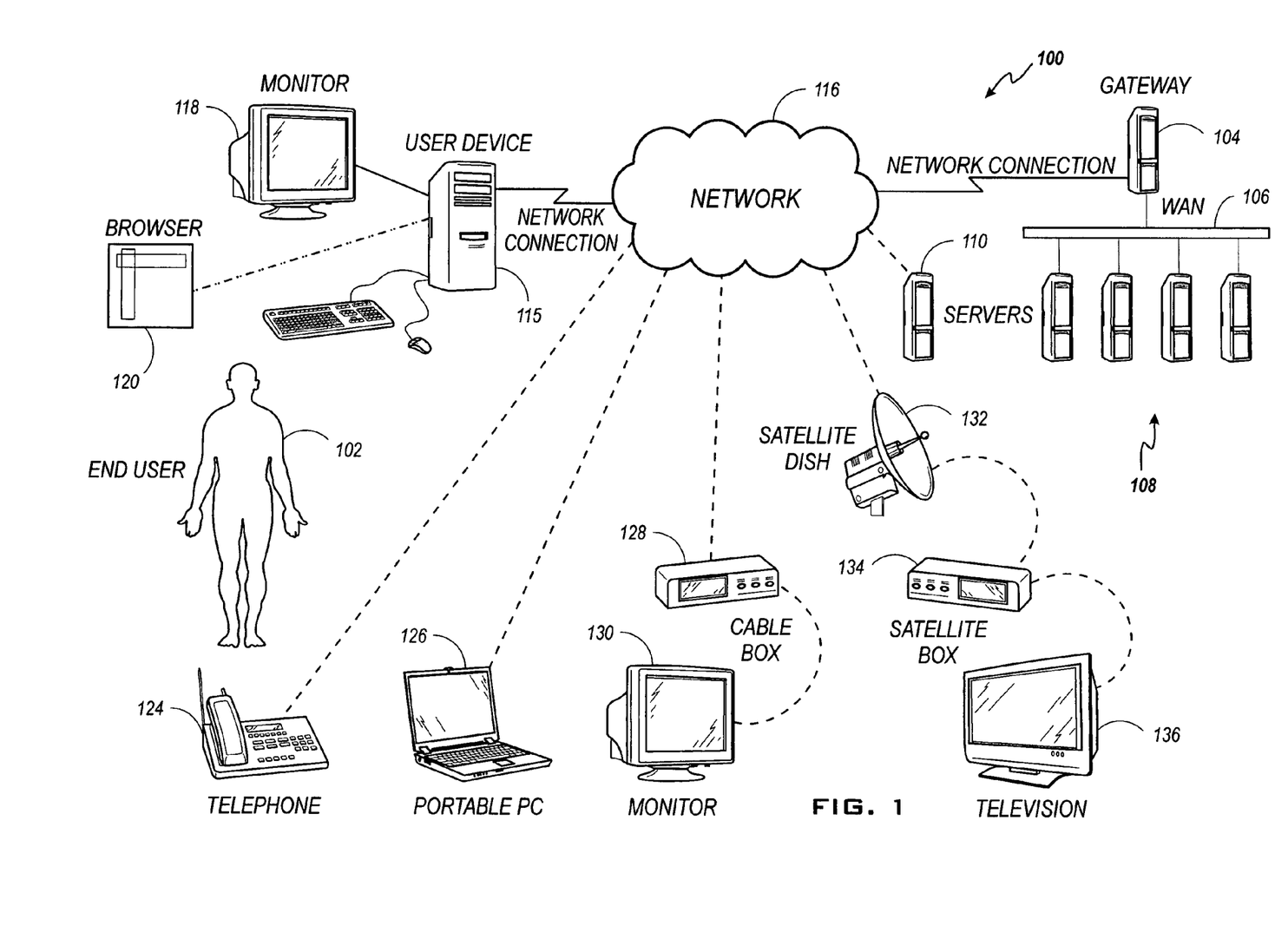
FIG. 1 illustrates a typical network configuration in which this invention may operate.

FIG. 1 illustrates a typical network configuration 100 in which this invention may operate. However, various other types of electronic devices communicating in a networked environment may also be used. An end user 102 communicates with a computing environment, which may include multiple server computers 108 or a single server computer 110 in a client/server relationship on a network communication medium 116. In a typical client/server environment, each of the server computers 108, 110 may include a server program that communicates with a user device 115, which may be a personal computer (PC), a hand-held electronic device (such as a PDA), a mobile or cellular wireless phone, a TV set, or any number of other electronic devices.

The server computers 108, 110, and the user device 115 may each have any conventional general purpose single- or multi-chip microprocessor, for example a Pentium processor, a Pentium Pro processor, a MIPS processor, a Power PC processor, an ALPHA processor, or other general purpose processors. In addition, the microprocessor may be any conventional special purpose microprocessor such as a digital signal processor or a graphics processor. Additionally, the server computers 108, 110 and the user device 115 may be desktop, server, portable, hand-held, set-top, or other desired type of computing device. Furthermore, the server computers 108, 110 and the user device 115 each may be used in connection with various operating systems, including, for example, UNIX, LINUX, Disk Operating System (DOS), VxWorks, PalmOS, OS/2, Mac OS, a version of Microsoft Windows, or other operating system.

The server computers 108, 110 and the user device 115 may each include a network terminal equipped with a video display, keyboard and pointing device. In one embodiment of the network configuration 100, the user device 115 includes a network browser 120 used to access the server computers 108, 110. The network browser 120 may be, for example, Microsoft Internet Explorer or Netscape Navigator. The user 102 at the user device 115 may utilize the browser 120 to remotely access the server program using a keyboard and/or pointing device and a visual display, such as a monitor 118. Although FIG. 1 shows only one user device 115, the network configuration 100 may include any number of client devices.

The network 116 may be any type of electronic transmission medium, for example, including but not limited to the following networks: a virtual private network, a public Internet, a private Internet, a secure Internet, a private network, a public network, a value-added network, an intranet, or a wireless gateway. The term "virtual private network" refers to a secure and encrypted communications link between nodes on the Internet, a Wide Area Network (WAN), Intranet, or any other network transmission means.

In addition, the connectivity to the network 116 may be via, for example, a modem, Ethernet (IEEE 802.3), Token Ring (IEEE 802.5), Fiber Distributed Datalink Interface (FDDI), Asynchronous Transfer Mode (ATM), Wireless Application Protocol (WAP), or other form of network connectivity. The user device 115 may connect to the network 116 by use of a modem or by use of a network interface card that resides in the user device 115. The server computers 108 may be connected via a wide area network 106 to a network gateway 104, which provides access to the wide area network 106 via a high-speed, dedicated data circuit.

As would be understood by one skilled in the technology, devices other than the hardware configurations described above may be used to communicate with the server computers 108, 110. If the server computers 108, 110 are equipped with voice recognition or Dual Tone Multi-Frequency (DTMF) hardware, the user 102 may communicate with the server computers by use of a telephone 124. The telephone may optionally be equipped with a browser 120 and display screen. Other examples of connection devices for communicating with the server computers 108, 110 include a portable personal computer (PC) 126 or a personal digital assistant (PDA) device with a modem or wireless connection interface, a cable interface device 128 connected to a visual display 130, or a satellite dish 132 connected to a satellite receiver 134 and a television 136. Still other methods of allowing communication between the user 102 and the server computers 108, 110 are additionally contemplated by this application.

Additionally, the server computers 108, 110 and the user device 115 may be located in different rooms, buildings or complexes. Moreover, the server computers 108, 110 and the user device 115 could be located in different geographical locations, for example in different cities, states or countries. This geographic flexibility which networked communications allows is additionally within the contemplation of this application.

Figure 2:
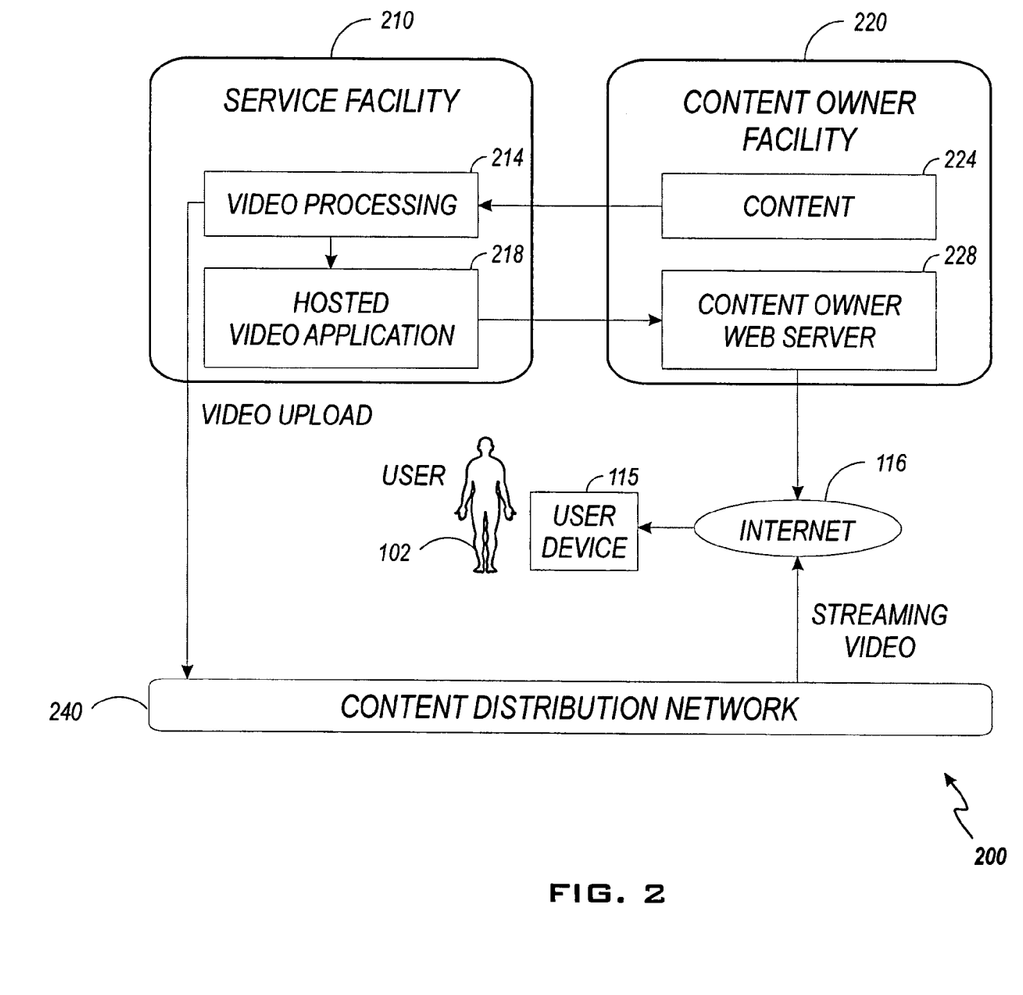
FIG. 2 is a block diagram of a system architecture overview in accordance with one embodiment of the invention.

FIG. 2 is a block diagram of a system architecture 200 overview in accordance with one embodiment of the invention. In this embodiment, the system architecture 200 includes a service facility 210, which includes a video processing module 214 for encoding and indexing video content 224. The service facility 210 further includes a hosted video application module 218, which communicates with the video processing module 214 for receiving index and metadata information. The video processing module 214 additionally communicates with a content distribution network 240 for uploading encoded video.

The system architecture 200 additionally includes a content owner facility 220. The content owner facility 220 may include media content 224 for transferring to the video processing module 214 as shown in FIG. 2. In another embodiment, the media content 224 may be located other than at the content owner facility 220 and transferred from any device connected to the network 116 as shown in FIG. 1, or may be transferred by other means as a live feed or recorded on a physical tape. The content owner facility 220 further includes a content owner web server 228, which communicates with the hosted video application 218 for transferring video search requests and receiving search results data. The system architecture 200 further includes a communications network 116, such as the Internet. The content owner web server 228 communicates with the service facility 210 and content distribution network 240 via the Internet 116. The content distribution network 240 may be part of a wide variety of video serving mechanisms and infrastructure that serve to deliver media content 224 to the end user 102. The content distribution network 240 may include a content owner running a simple video server at the content owner facility 220, a complex edge caching content distribution mechanism, or other mechanisms to deliver video and other media content to end users 102.

The following paragraphs provide a description of the operation of an embodiment of the system architecture 200 of FIG. 2. A content owner operates a website, either hosted internally on the content owner web server 228 or outsourced to a web-hosting service provider, which delivers their branded interface to end users 102. The content owner delivers raw media content 224 to the service facility 210 for video indexing and encoding by the video processing module 214. Media content 224 may be provided or delivered as analog video tape in any format, as a broadcast, cable, or satellite feed, or as digitized video in any format delivered via network communications, for example via file transfer protocol ("FTP"). Regardless of its original form, the content 224 is processed by the video processing module 214 to encode the content 224 and extract index data. The index data may include, for example, keyframes, closed-caption text, speaker identifications, facial indentifications, or other index data. The content 224 may additionally undergo an editorial process whereby humans label the video by providing, for example, annotations, descriptions, or keywords. The index and annotation information, herein referred to as metadata, is maintained by the hosted video application 218, while the encoded video is uploaded to the content distribution network 240.

In one embodiment, content 224 that is originally in analog form is encoded into a digital format in such a way that the time synchronization between the metadata and the encoded video is accurate, as is described in U.S. application Ser. No. 09/134,497, filed Aug. 14, 1998 and titled "VIDEO CATALOGER SYSTEM WITH SYNCHRONIZED ENCODERS," which is hereby incorporated by reference. Content 224 that is originally in digital form, typically a high-resolution format, is transcoded into an appropriate format for delivery. Typically, video content 224 is encoded in multiple formats (for example RealVideo, Microsoft Windows Media, Quicktime, or MPEG) and bit rates (for example modem speed or broadband speed) to offer end users 102 a choice, often depending on individual preferences or Internet connection bandwidth. The resulting digital video files from either encoding or transcoding are uploaded to the content distribution network 240, which delivers the actual encoded video for display to the end user 102. Once the end user 102 selects an actual segment of video content 224 to view, the appropriate video is transferred from the content distribution network 240 to the end user's browser for display via the Internet 116.

Figure 3:
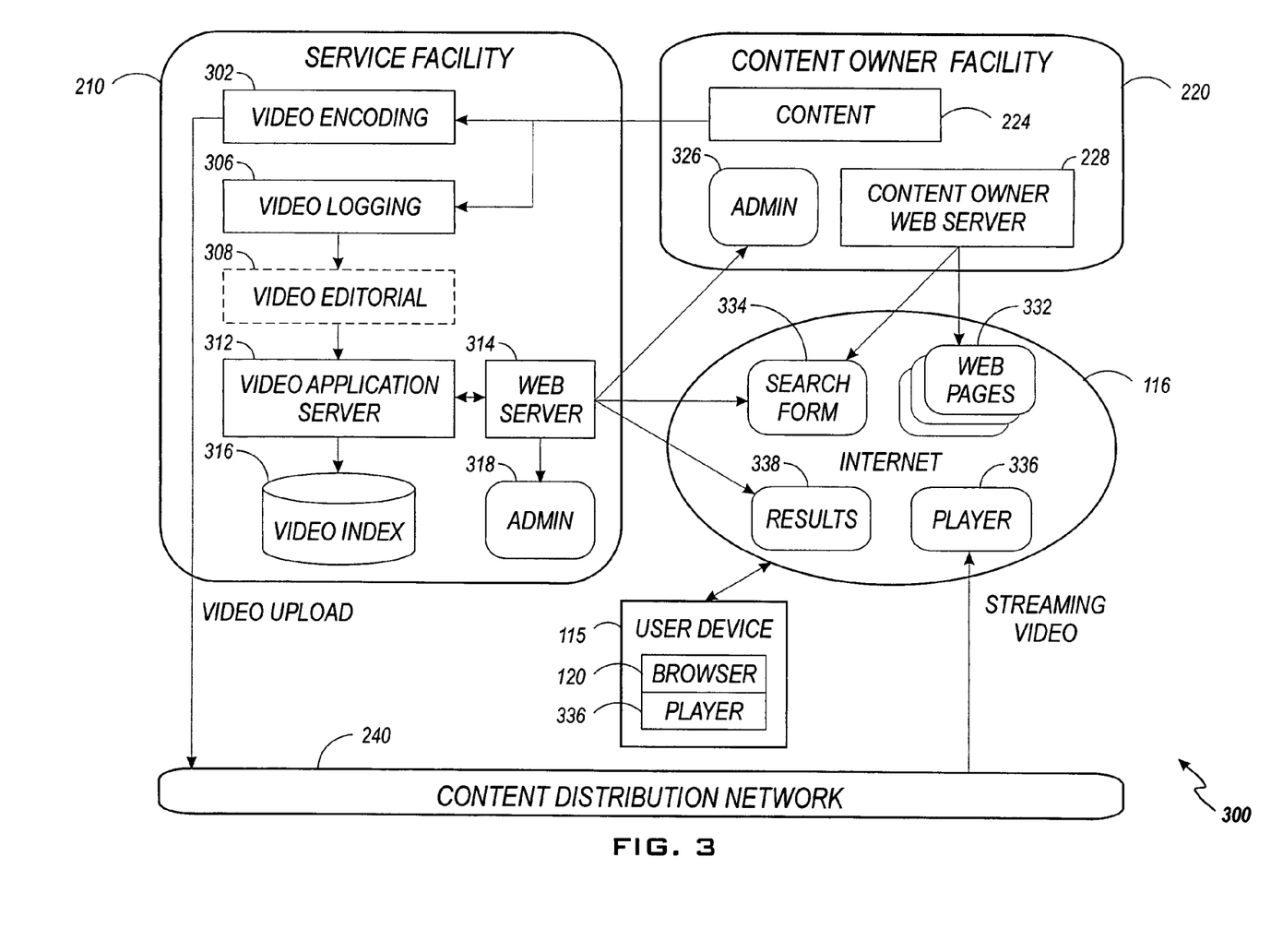
FIG. 3 is a block diagram of an architecture of the service facility, the content owner facility, the global communication network or Interner, and the content distribution network in accordance with another embodiment of the invention.

FIG. 3 is a block diagram of an architecture 300 of the service facility 210, the content owner facility 220, the global communication network or Internet 116, and the content distribution network 240 in accordance with another embodiment of the invention. The embodiment of FIG. 3 is similar to that in FIG. 2, but is depicted in greater detail. In this embodiment, the service facility 210 includes a video encoding module 302, which receives media content 224 from the content owner facility 220. The service facility 210 additionally includes a video logging module 306, which receives media content 224 from the content owner facility 220. The service facility 210 further includes a video editorial module 308, which communicates with the video logging module 306 to receive video index and metadata information. The service facility 210 further includes a video application server 312, which communicates with the video editorial module 308 to receive index, metadata, and human-directed annotation information. The service facility 210 further includes a web server 314, which communicates with the video application server 312. The service facility 210 further includes a video index 316, which communicates with the video application server 312 to transfer index, metadata and annotation information. The service facility 210 further includes a server administration display page 318, which may be one or more web pages, that communicates with the web server module 314 to manage video indexes, accounts, template views, or perform other administrative tasks.

In one embodiment, the content owner facility 220 includes the media content 224 as described above. The content owner facility 220 additionally includes a server administration module 326 communicating with the service facility web server 314. The content owner facility 220 further includes the content owner web server 228, which accesses web pages 332 and a search form 334 via the Internet 116. Each web page 332 may depict a plurality of pages rendered by various web servers. The search form 334 allows user selection of arbitrary search criteria of video content on the content owner website, and the search criteria are communicated to the service facility web server 314. Further provided via the Internet 116 are results data 338, which are generated by the service facility web server 314. Also accessible via the Internet 116 is a video player 336, which receives encoded video from the content distribution network 240.

The following paragraphs provide a description of the operation of one embodiment of the architecture 300 shown in FIG. 3. In this embodiment, the video application server 312 manages the video index 316 containing metadata and annotations produced by the video logging 306 or video editorial 308 modules. The application server 312 receives metadata and annotations from the video logging 306 or video editorial 308 modules, and transfers video search form 334 queries and results 338 data to the web server 314 for display to an end user 102 in a web browser at the user device 15 via the Internet 116.

In a further embodiment, regardless of its original form, the content 224 is processed by the video logging module 306 to extract index data, for example keyframes, closed-caption text, speaker identifications, facial identifications, or other index data. The content 224 may additionally undergo processing by the video editorial module 308, whereby humans may elect to label the content 224 by providing annotations, descriptions, keywords, or other labeling or marking information. The index and annotation information is transferred to the video application server 312, which hosts publishing, search, retrieve, browse, or other related video services. The video application server 312 may maintain the metadata in the video index 316. The video application server 312 provides the above-described video services to the content owner web server 228 for incorporation in the content owner's web pages 332 via the template mechanism described above.

Figure 4:
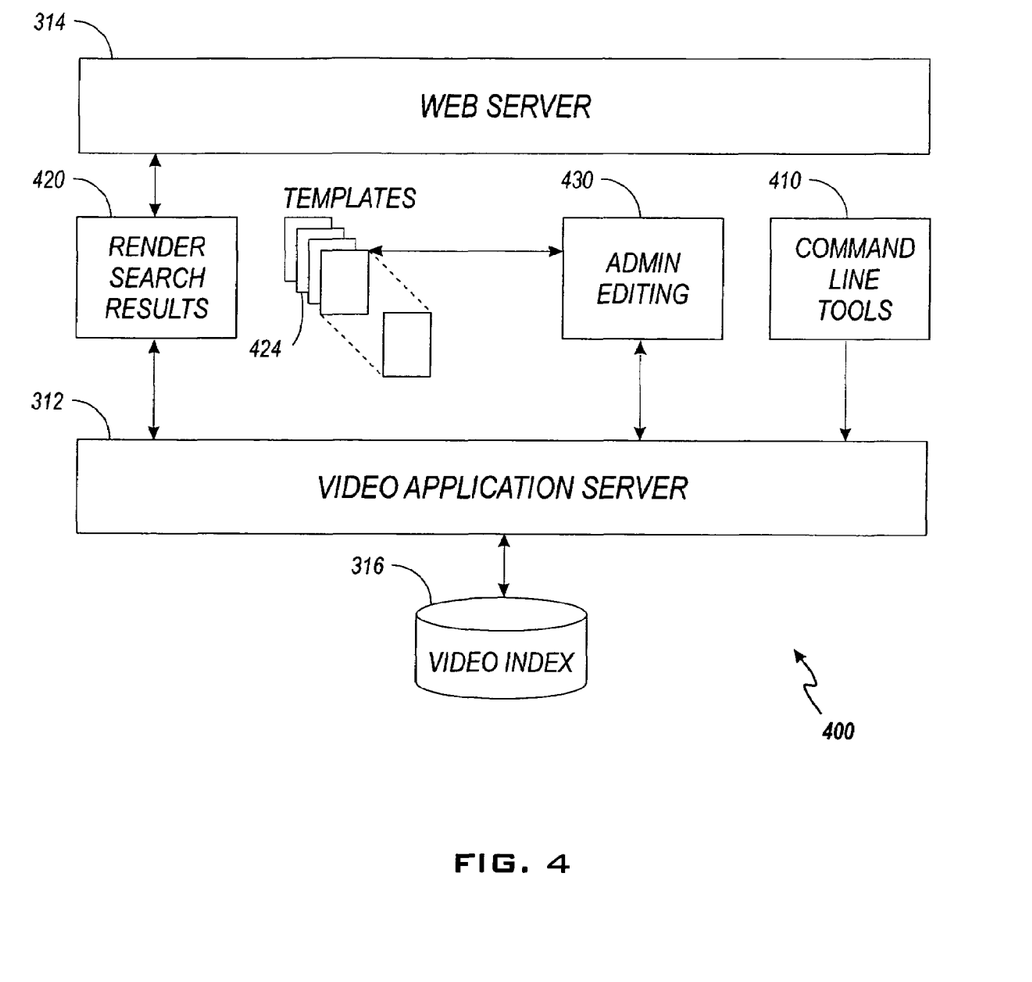
FIG. 4 is a block diagram of a video application server architecture as shown in the service facility embodiment of FIG. 3.

FIG. 4 is a block diagram of a video application server architecture 400 as shown in the service facility 210 embodiment of FIG. 3. In one embodiment, the architecture 400 includes the video application server 312, the web server 314, the video index 316, and the administration display pages 318 as shown and described regarding FIG. 3. The architecture 400 further includes command line tools 410, which allow for manual control via the execution of command line utilities as well as batching of commands in a scripting manner to automate various tasks. The communication of search form 334 queries and results data 338 to the web server 314, as shown in FIG. 3, includes an exchange of XML data, although one skilled in the technology will understand that other data exchange formats may also be utilized. Final HTML rendering of search forms 334, results data 338 presentation, and video player 336 playback windows may be accomplished via templates 424, whereby such templates 424 dictate the graphical look-and-feel of the final media presentation. Actual metadata results, communicated via XML or other data exchange formats, may be rendered into the templates 424 by substituting special keywords with results from the video application server 312 to form an HTML-compliant presentation. The number of templates 424 is not fixed, typically depending on the desired end user interface and navigation aspects. This notion of an arbitrary number of templates 424 is depicted in FIG. 4 by the small dots connecting the fourth and fifth templates shown.

The architecture 400 additionally includes an administration editing module 430, which generates and manages display pages 318, typically web pages, for server administration, metadata editing, template manipulation, and batch processing. Batch processing may be accomplished for insertion processes, deletion or 'aging' processes, metadata editing, or for automated performance of other tasks as well. The administration editing module 430 communicates with the video application server 312 and web server 314, and updates various template 424 configurations. The administration editing module 430 further allows system administrators to manage the video application server 312, including, for example, index management, asset management, editing, and startup and shutdown control. The architecture 400 additionally includes a search results rendering module 420, which communicates with the video application server 312 and the web server 314, as well as receiving template 424 configurations for dynamically-generating search results data 338.

Figure 5:
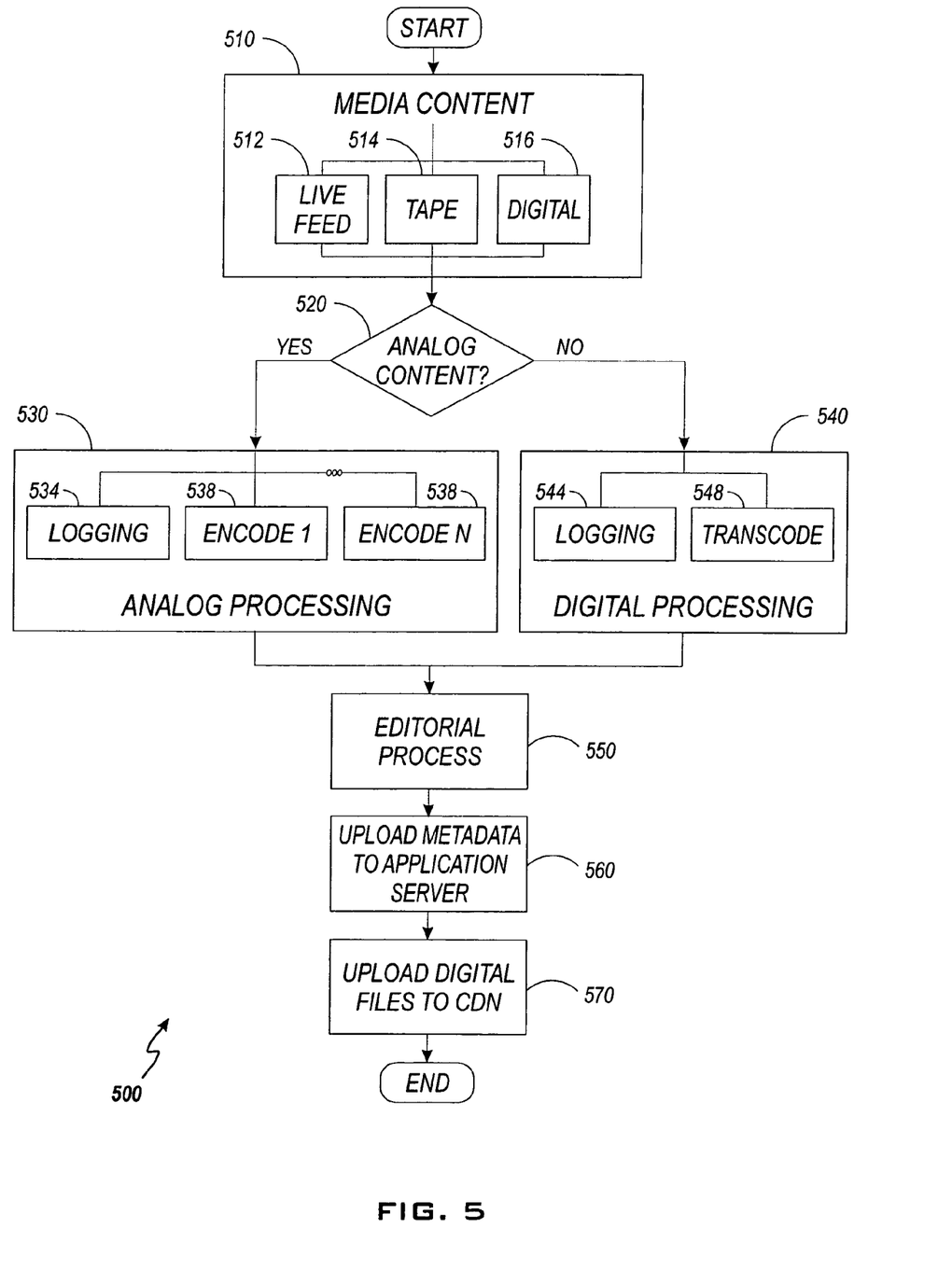
FIG. 5 is a flowchart of a process of acquiring, indexing, and publishing video content on behalf of the content owner as performed on an architecture such as shown in the embodiment FIGS. 3 and 4.

FIG. 5 is a flowchart of a process 500 of acquiring, indexing, and publishing video content on behalf of the content owner as performed on an architecture such as shown in the embodiment of FIGS. 3 and 4. In one embodiment, the process 500 of FIG. 5 relates to operation of the components of the service facility 210 as described in FIGS. 2 and 3. A media content stage 510 of the content owner facility module 220 provides media content 224 to the service facility 210. The content may be in several forms, for example a live signal feed 512 captured over broadcast airways, cable, or satellite, a physical tape 514, for example VHS, Beta SP, or other video cassette tape, or an encoded digital file 516 that has been sent via tape, disk, or network communications such as FTP. A determination is made at decision block 520 whether the media content 224 is in analog form. If the media content 224 is in analog form, the process 500 continues to block 530, described below. Otherwise, the process 500 continues to block 540, which is also described below. At block 530, a logging stage 534 of the video logging module 306 indexes the analog content 224 to perform baseline, automated extraction of video metadata, for example keyframes, closed-caption text, speech transcripts, or other metadata. Additionally at block 530, one to N encoding stages 538 of the video encoding module 302 encode the analog content 224 into one or more digital formats for streaming on the Internet 116. At block 540, a logging stage 544 of the video logging module 306 indexes the digital content 224 to perform baseline, automated extraction of video metadata, for example keyframes, closed-caption text, speech transcripts, or other metadata. Also at block 540, a transcoding stage 548 of the video encoding module 302 transcodes the digital content 224 into one or more formats for streaming on the Internet 116. Typically, the video is prepared in several formats and bit rates to accommodate the various needs of end users 102.

At the completion of either the analog processing at block 530 or the digital processing at block 540, process 500 advances to a video editorial stage 550, which provides content owners the capability to direct or perform editorial functions on the processed video. At this stage 550, the content owner at the content owner facility 220 may provide guidelines to further annotate, describe, and clip mark the video by accessing and augmenting the baseline video index. Such annotation may by added by an automated tool such as the video logging module 306, a human operator using an editorial tool such as a metadata editor software module, or other annotation mechanism. The guidelines provided will typically vary among different content owners, but may include, for example, assigning keywords from a controlled vocabulary, creating clip summaries, providing categories or classifications from a list provided by the content owner, or any number of other marks or text that might be added. An upload metadata stage 560 uploads video indexes in final form via a network connection to the video application server 312 for access by end users 102. In a further embodiment, the application server 312 is located in a hosting facility providing robust and redundant power and network connections to the Internet 116. At block 570, an upload digital files to CDN stage uploads digital video files to the content distribution network 240 for efficient access by end users 102.

Figure 6:
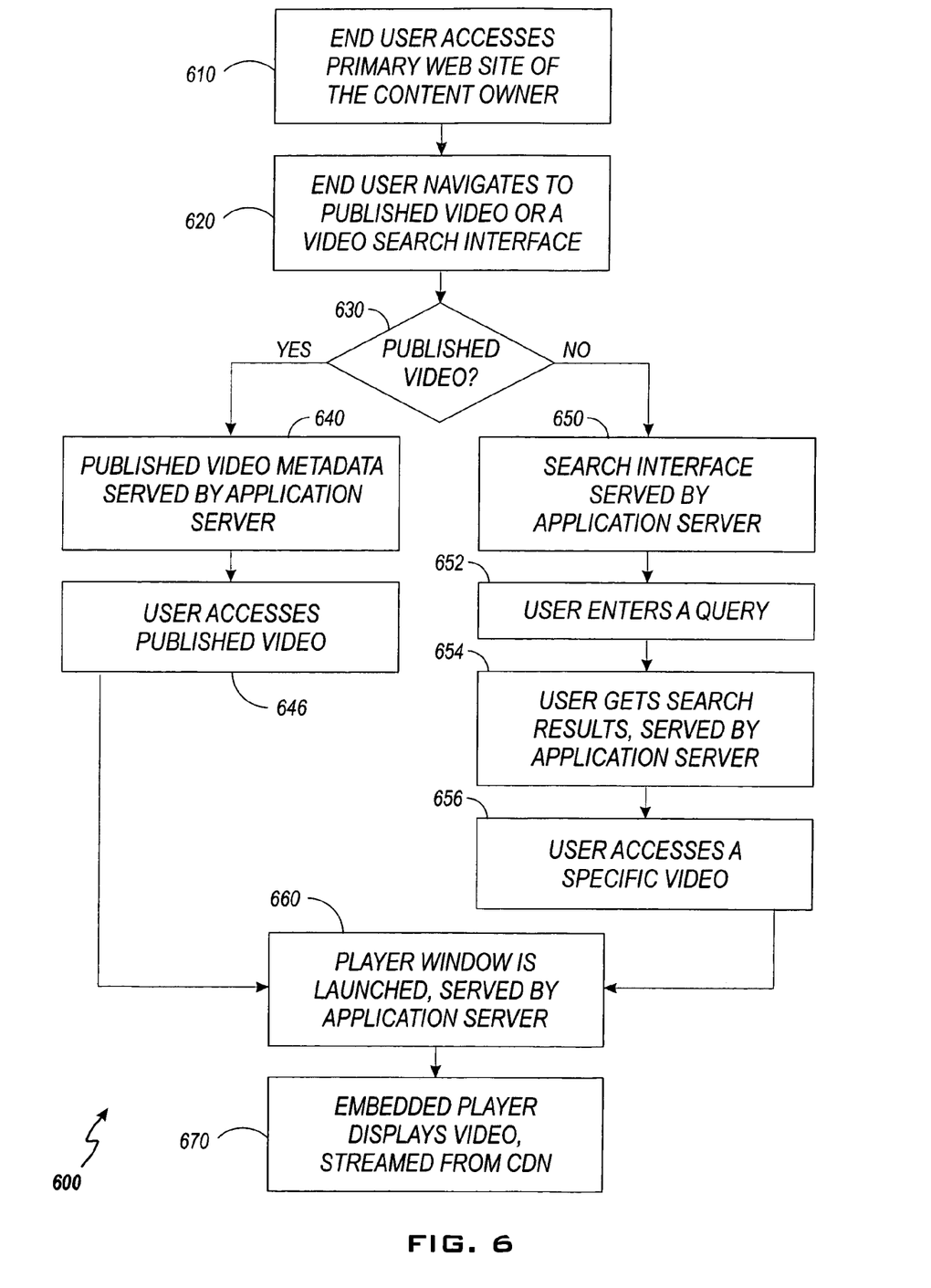
FIG. 6 is a flowchart of a process of an end-user's interaction with a video application server embodiment such as shown in FIGS. 3 and 4.

FIG. 6 is a flowchart of a process 600 of an end-user's interaction with a video application server 312 embodiment such as shown in FIGS. 3 and 4. In one embodiment, at block 610, the end user 102 accesses the primary website of the content owner hosted by the content owner web server 228. At block 620, the end user 102 navigates the website to access either published video, for example top stories, most popular videos, or video pick-of-the-day, or the search form 334, allowing selective search of all video on the site. A determination is made at decision block 630 whether the user 102 is navigating to published video. If the user is navigating to published video, the process 600 proceeds to block 640, which is discussed below. If the user 102 is navigating to the search form 334, the process 600 proceeds to block 650, which is also discussed below.

In the case where the user 102 is navigating on the website to published video, at block 640 the video is manifested by displaying any of the video metadata available about that piece of video, for example, keyframes, transcript, title, description, or other metadata. Advancing to block 646, the end user 102 accesses published video by selecting the desired video metadata displayed at block 640.

In the alternate case where the end user 102 accesses a page containing a search form 334, at block 650 the search interface is served by the video application server 312, and other page elements are served as described below. Continuing at block 652, the user 102 may then issue a query to search for video by typing in keywords to the search form 334, or by selecting options from pull-down menus or category selections. At block 654, the query is issued to the application server 312, which processes the query to identify video clips that match the query. The end user 102 is presented with the query results 338 on a portion of a new web page 332 (as will be shown in FIG. 7 below) consisting of various metadata elements for each video clip that matched the query, for example keyframes, titles, descriptions, or other metadata elements. As described above, elements displayed in the query results web page 332 are served by the content owner's web server 228, ad servers, caching servers, or other servers, but the query results data 338 is served and injected into the page by the video application server 312 using template-driven dynamic HTML. Examples of several elements provided by various servers will be further shown in FIG. 7 below.

At block 656, the user 102 may select to access a specific video by selecting a desired HTML link in the search results web page 332. At block 660, the accessed video information is served by the video application server 312 using dynamic HTML injection into the web page 332. All other elements forming the web page 332 are served by the content owner's own web server 228, or other sources such as ad servers or caching edge-network servers. The resulting web pages 332 seen by the end user 102 are complete HTML web pages containing information from all of these sources, and in particular, the video metadata elements that describe the published video and which provide links to actually access the video.

The end user 102 ultimately makes a video clip selection, whether published video or video search results, that they wish to actually view. Video clip selection may be invoked in a number of ways, for example clicking on a keyframe, a title, or part of a transcript, as will be shown in reference to FIG. 7 below. The selection uses associated time code information automatically captured during the logging processes 634, 644 to access an actual video stream for playback. Typically, a separate browser window is launched, containing an embedded video player 336 that corresponds to the format of the video being viewed, for example RealVideo, Microsoft, Quicktime, or other media format. This window may be served by the video application server 312, but may contain other elements that originate from other servers, such as advertising, graphical branding, navigation elements, e-commerce opportunities, or other elements. At block 670, the embedded video player 336 is invoked with the video asset identifier, location on the content distribution network 240, and a time code offset for playback. The player 336 then contacts the content distribution network 240 to initiate video playback. The end user 102 may view the encoded video, and may use standard video player controls provided by the embedded player 336, for example, stop, pause, or rewind video playback controls.

Figure 7:
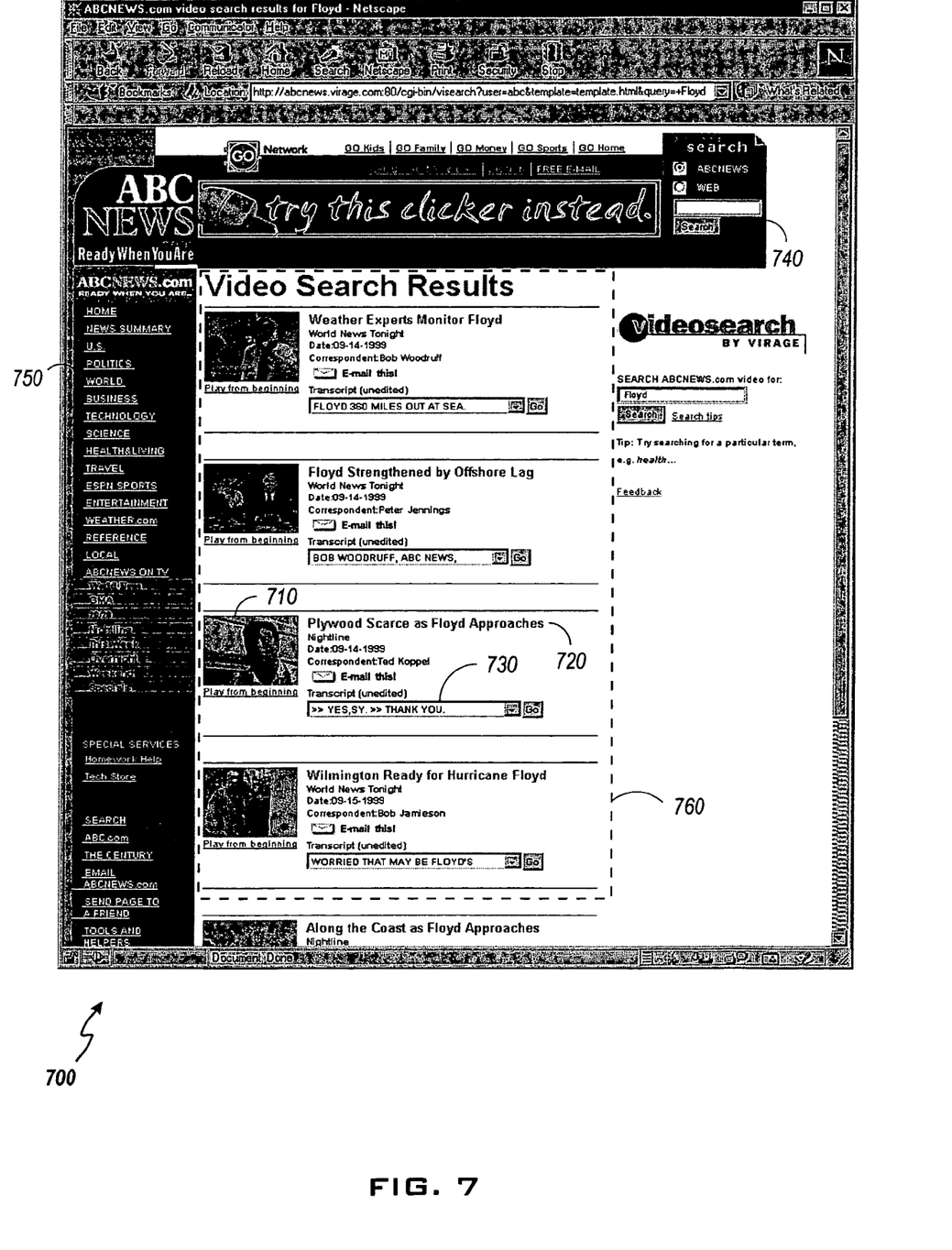
FIG. 7 is an example of a screen display of rendered video search results within the presentation of a content owner's website.

FIG. 7 is an example of a screen display of rendered video search results within the presentation of a content owner's website. The central portion of the screen contains the results of a video search by the end user 102, shown as metadata elements such as a keyframe or thumbnail image 710, a story title 720, and a pull-down menu 730 that allows access to the text transcript associated with the video. Video clip selection may be invoked in a number of ways, for example, by clicking on the keyframe 710, the title 720, or part of the transcript 730. The remainder of the screen display includes menu-based navigation 750, advertising 740, and associated graphical and text elements provided by the content-owner's web server 228. The video search results 760 are injected into this framework using the template mechanism of the video application server 312, as described above in reference to FIGS. 3 and 4, using techniques that will be understood by one skilled in the technology of assembling web pages using fragments of HTML produced by diverse web servers.

As described herein, the invention fills the longstanding need in the technology of a system whereby a service provider can offer a hosted application and associated services for encoding and indexing video media that achieve the content owner's business goals without requiring the existence of technical infrastructure and expertise within the content owner's own organization. While the above detailed description has shown, described, and pointed out novel features of the invention as applied to various embodiments, it will be understood that various omissions, substitutions, and changes in the form and details of the device or process illustrated may be made by those skilled in the art without departing from the spirit of the invention. The scope of the invention is indicated by the appended claims rather than by the foregoing description. All changes which come within the meaning and range of equivalency of the claims are to be embraced within their scope.

What is claimed is:

1. A system for hosting of video content over a network, comprising:
    a content owner facility comprising a content owner network server;
    a service facility receiving the video content from a content source, the service facility comprising:
        a video encoding module configured to encode the video content;
        a video logging module configured to generate an index of the video content;
        a video application server module configured to receive the index of the video content; and
        a service facility network server configured to receive the index of the video content and produce electronic templates for use by the content owner network server; and
    a content distribution network configured to receive encoded video content from the video encoding module and provide encoded video content to a user based on user selection.

2. The system as defined in claim 1, wherein the content owner network server comprises a content owner web server having a plurality of content owner electronic pages.

3. The system as defined in claim 1, wherein the service facility further comprises a video index database including video index data.

4. The system as defined in claim 3, wherein the video index database further includes video metadata.

5. The system as defined in claim 1, wherein the content owner facility includes a content owner website.

6. The system as defined in claim 1, wherein the service facility network server includes a service facility web server.

7. The system as defined in claim 6, wherein the service facility web server is configured to produce one or more search form web pages.

8. The system as defined in claim 6, wherein the service facility web server is configured to produce search results information.

9. The system as defined in claim 1, wherein the service facility further comprises an administration module configured to manage the service facility network server.

10. The system as defined in claim 1, wherein the service facility further comprises a video editorial module configured to allow human-directed annotation of the video content.

11. The system as defined in claim 1, wherein the service facility further comprises an administration module configured to manage the service facility network server.

12. The system as defined in claim 1, wherein receiving the video content from a content source comprises receiving one or more computer files electronically.

13. The system as defined in claim 1, wherein receiving the video content from a content source comprises receiving one or more physical copies of the content.

14. The system as defined in claim 13, wherein at least one of the physical copies is received on an optical disk or video tape.

15. The system as defined in claim 1, wherein receiving the video content from a content source comprises receiving a broadcast signal.

16. The system as defined in claim 1, wherein the content source comprises the content owner facility.

17. A method for hosting of video content over a network, comprising:
    providing video content from a video content source for video processing;
    encoding the video content, wherein the encoded content is provided to a network;
    indexing the video content to generate a video index;
    providing video elements from a video application for incorporation in a content owner network site; and
    delivering the encoded video to a user via the network based on user selection;
    wherein the video content is delivered from a remote location to the location where the video content is encoded and indexed, and wherein the content owner network site is also remote from the location where the video content is encoded and indexed.

18. The method as defined in claim 17, wherein the network comprises a content distribution network.

19. The method as defined in claim 17, further comprising storing the video index in a database.

20. The method as defined in claim 17, wherein the content owner network site includes a content owner website.

21. The method as defined in claim 17, wherein the video elements comprise HTML instructions.

22. The method as defined in claim 17, further comprising providing search results information.

23. The method as defined in claim 17, wherein providing video content from a video content source comprises providing one or more computer files electronically.

24. The method as defined in claim 17, wherein providing video content from a video content source comprises providing one or more physical copies of the content.

25. The method as defined in claim 17, wherein providing video content from a video content source comprises providing a broadcast signal.

26. The method as defined in claim 17, wherein the video content source comprises a content owner facility.

27. A system for delivering media content services over a network, comprising:
    media content to which a content owner has rights;
    a content owner facility comprising a content owner web site associated with a content owner network server;
    a service facility receiving the media content from a media content source, the service facility comprising:
        a video processing module configured to extract metadata from the media content and encode the media content; and
        a hosted video application module configured to provide video elements for display on the content owner web site at the content owner facility; and
    a content distribution network providing media content to a user from the service facility based on user selection.

28. The system as defined in claim 27, wherein the service facility further comprises a network server.

29. The system as defined in claim 27, wherein the network is the Internet.

30. The system as defined in claim 28, wherein the network server is a web server.

31. The system as defined in claim 27, wherein the video elements include HTML instructions.

32. The system as defined in claim 27, wherein the media content is encoded video content.

* * * * *